UNITED STATES PATENT OFFICE.

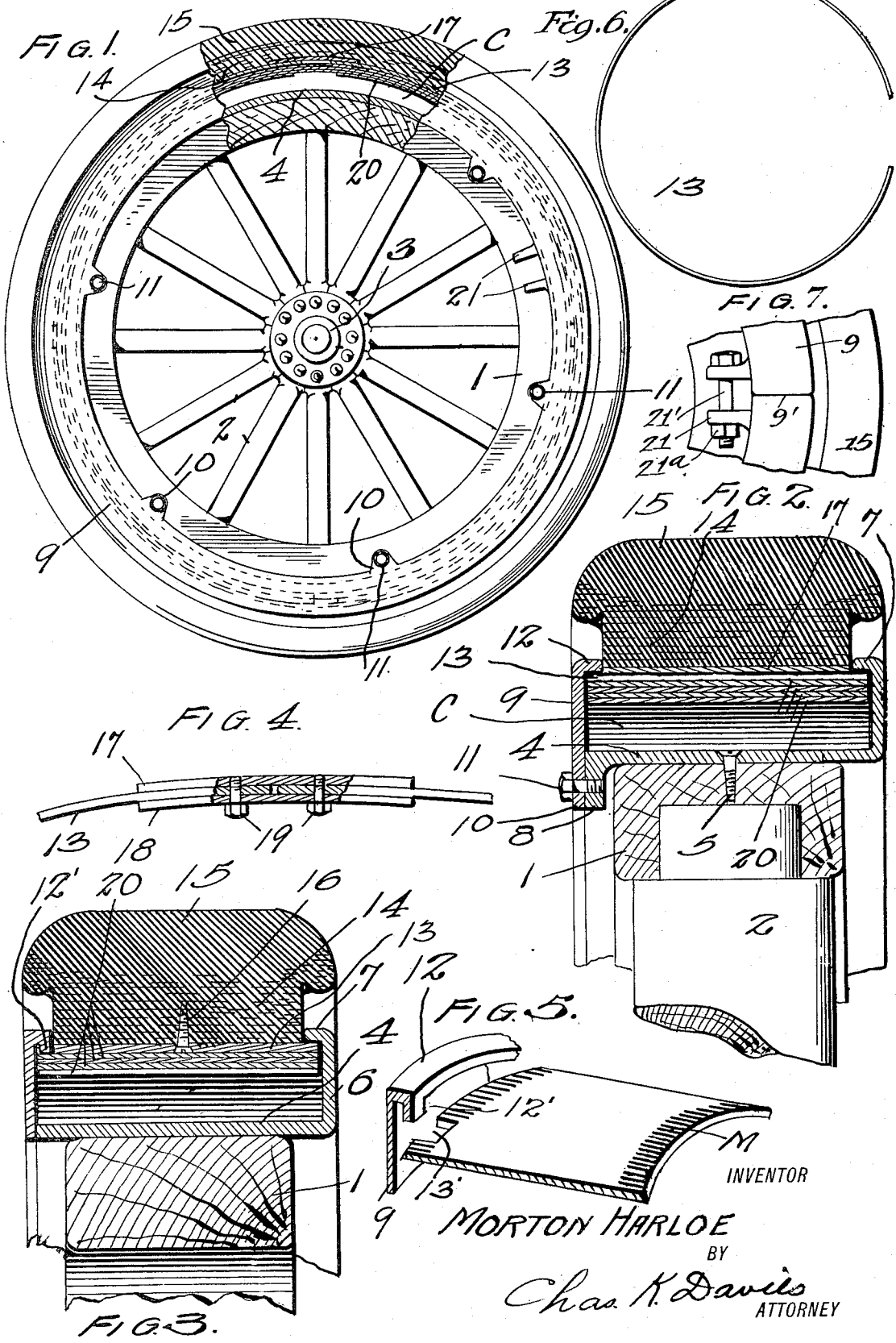

MORTON HARLOE, OF WINCHESTER, VIRGINIA, ASSIGNOR TO LIBERTY TIRE COMPANY, OF WINCHESTER, VIRGINIA.

RESILIENT WHEEL.

1,287,682.

Specification of Letters Patent.

Patented Dec. 17, 1918.

Application filed November 19, 1917. Serial No. 202,803.

*To all whom it may concern:*

Be it known that I, MORTON HARLOE, a citizen of the United States of America, residing at Winchester, in the county of Frederick and State of Virginia, have invented certain new and useful Improvements in Resilient Wheels, of which the following is a specification.

The present invention relates to improvements in resilient wheels designed particularly for use on automotive vehicles of the several types of commercial cars, passenger or pleasure cars, trucks, etc., and, while the invention is applicable for use in all relations where such a wheel is needed, it is specially adapted for use on automobiles in the country and rural districts where the irregularities of the roads and generally poor conditions render the use of a nonpuncturable tire very desirable.

While my invention contemplates the construction of the entire wheel and may, when desired, be embodied in the entire wheel structure, the nature of the invention lends itself particularly to the manufacture of the tire portion of the wheel which is adapted for use with wheels already employed, by removing the tire portion from the felly, and substituting therefor my invention, in the nature of a wheel attachment or tire. Thus the invention may be embodied in the complete wheel as an article of manufacture, or the invention may be embodied in a wheel attachment or tire, for converting wheels already in use, and for replacing worn or punctured pneumatic tires.

In the accompanying drawings I have illustrated one complete example of the physical embodiment of my invention, constructed and arranged according to the best mode I have so far devised for the practical application of the principles of my invention.

Figure 1 is a side elevation of a wheel, partly broken away for convenience of illustration, showing the adaptation of my invention to a wheel of well known type.

Fig. 2 is an enlarged, transverse sectional view of the wheel felly and tire, showing a part of a spoke.

Fig. 3 is another transverse sectional view of the tire and felly.

Fig. 4 is a detail edge view, partly in section, of the main peripheral spring and its retaining plates, before its application to the tire.

Fig. 5 is a detail, fragmentary view, showing the relation of the side ring to the main peripheral spring.

Fig. 6 is a detail view of one of the circular springs.

Fig. 7 is a detail showing manner of bolting together sawed ends of the side ring.

In the drawings I have exemplified a wheel of well known type having the usual wood felly 1, the spokes 2 and hub 3, which may form a part of the wheel as a complete article of manufacture, or which, as hereinbefore indicated, may be a structure from which the tire has been removed, and the wheel attachment or tire of my invention substituted therefor.

The inner rim 4 of the invention is a circular plate, of metal, fitted around the felly 1 and fixed thereto by screws as 5 so that the rim and felly are rigid with each other. The rim 4 is fashioned with a side flange 6 in the form of a fixed ring projecting from the rim, and at its periphery this ring is provided with an inturned, horizontally projecting flange 7, while at its opposite edge the rim has a series of spaced, inwardly projecting, perforated bosses 8 through the instrumentality of which the detachable side ring 9 is attached to the rim. The side ring 9 is equipped with integral perforated lugs 10, arranged complementarily to the perforated bosses 8 and bolts 11 are employed to secure the side ring to the inner rim 4 through these bosses and lugs.

The side ring 9 also is fashioned with a horizontally, inwardly projecting flange 12 complementary to the flange 7 of the fixed side ring, and these two flanges are designed to retain the resilient annular plate or peripheral spring 13 in the space or chamber C formed about the felly. The peripheral spring 13 has fixed thereon the outer rim or tire, comprising the laminated portion 14 and the rubber tread 15, screws 16 being utilized to hold the parts together.

The laminated portion 14 is preferably made of layers of textile material or fabric wound upon themselves, and compactly and solidly held together by the interposition of proper and suitable cement, and the tread portion 15 of the tire has as its components the usual rubber composition.

The peripheral or main spring 13 as seen in Fig. 6, is an open ring, preferably of tempered steel, and before applying for use on the wheel this spring is held by the retaining plates 17 and 18, the plates and ring or spring being perforated near the ends of the open ring to accommodate the bolts or screws 19. Thus the bolted plates hold the open ring with its ends practically closed, as in Fig. 4, until the tire and main spring have been applied to the chambered rim of the wheel with the milled edges M of the spring under the flanges 7 and 12 respectively. Before the side ring 9 is applied, however, the plate 18 is removed, after unscrewing the bolts 19, and the resiliency of the spring 13 causes its ends to separate, as indicated in Fig. 1, and the ends slide against the plate 17 which now performs the function of a wear plate for the main spring as it moves and absorbs shocks or weights on the wheel. To prevent the spring from moving or creeping circumferentially of the two flanges 7 and 12, and yet permit the spring to flex and expand and contract as the wheel travels, I preferably provide one or more inwardly projecting, radial lugs 12' on the flange 12 that project into and work in the open slot 13' in the edge of the main spring, and the milled edges M also tend to prevent excessive longitudinal movement of the main spring with relation to the flanges 7 and 12.

In addition to the main spring 13 I utilize also, one or more auxiliary springs 20, comprising resilient open rings, of tempered steel, and placed within the chamber C, to aid and assist the main spring in absorbing the shocks strains, etc., of the wheel tire.

In some instances, the felly 1 of the used wheel may have an irregular periphery that will not receive the rim 4 without extreme difficulty, and to provide for this contingency I preferably cast two perforated and threaded lugs 21 at each side of the rim. Now when it is desired to place the rim over the felly, the rim may be sawed through transversely at 9', leaving a kerf therein, and then the rim "snapped" on the felly after which the lugs 21 may be joined by screws or bolts 21' and nut 21ª to clamp the rim tightly on the felly.

What I claim is:—

The combination in a resilient wheel with its felly, of a rim secured to the felly and provided with a flanged side ring, a detachable flanged side ring attached to the rim, a flat, open, resilient ring retained under tension of radial outward pressure by the flanges of the side rings, inwardly projecting lugs on the flange of the detachable ring and notches in the edge of the flat ring for engagement therewith, a tread portion secured to the resilient ring, and a wear plate embedded in the tread portion for the spaced ends of the open ring.

In testimony whereof I affix my signature.

MORTON HARLOE.